United States Patent
Kakeya et al.

(10) Patent No.: US 9,608,247 B2
(45) Date of Patent: Mar. 28, 2017

(54) ENERGY STORAGE DEVICE INCLUDING SPIRAL ELECTRODE GROUP WITH REINFORCED SEPARATOR

(71) Applicant: GS Yuasa International Ltd., Kyoto (JP)

(72) Inventors: Tadashi Kakeya, Kyoto (JP); Manabu Kanemoto, Kyoto (JP); Mitsuhiro Kodama, Kyoto (JP); Toshiyuki Nukuda, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 374 days.

(21) Appl. No.: 14/259,673

(22) Filed: Apr. 23, 2014

(65) Prior Publication Data

US 2014/0322577 A1    Oct. 30, 2014

(30) Foreign Application Priority Data

Apr. 26, 2013 (JP) ................. 2013-094495

(51) Int. Cl.
*H01M 4/00* (2006.01)
*H01M 2/18* (2006.01)
(Continued)

(52) U.S. Cl.
CPC ......... *H01M 2/18* (2013.01); *H01M 10/0431* (2013.01); *H01M 4/242* (2013.01);
(Continued)

(58) Field of Classification Search
CPC .... H01M 2/18; H01M 10/0431; H01M 4/242; H01M 4/32; H01M 6/10; Y02E 60/124; Y02P 70/54
(Continued)

(56) References Cited

U.S. PATENT DOCUMENTS 3,298,871 A * 1/1967 Lecouffe ................. H01M 6/10
429/94
5,849,430 A * 12/1998 Lee ....................... H01M 4/742
429/233

FOREIGN PATENT DOCUMENTS

JP    61-273874    12/1986
JP    09-147846    6/1997
(Continued)

OTHER PUBLICATIONS

Extended European Search Report dated Aug. 21, 2014 issued in the European patent application No. 14165996.1.

*Primary Examiner* — Gary Harris
(74) *Attorney, Agent, or Firm* — Rankin, Hill & Clark LLP (57) ABSTRACT

An energy storage device including a spiral electrode group in which a first electrode plate and a second electrode plate having polarity reverse to that of the first electrode plate are spirally wound with a separator interposed therebetween, wherein the second electrode plate is opposed to an inner circumference and an outer circumference of the first electrode plate, portions of the separator are reinforced, the reinforced portions of the separator include a first reinforced portion formed between a winding-start end of the first electrode plate and the second electrode plate located on a radially outer side of the winding-start end, and a second reinforced portion formed between the winding-start end of the first electrode plate and the second electrode plate located on a radially inner side of the winding-start end, and the first reinforced portion and the second reinforced portion are arranged apart from each other.

8 Claims, 6 Drawing Sheets (51) Int. Cl.
*H01M 10/04* (2006.01)
*H01M 4/24* (2006.01)
*H01M 4/32* (2006.01)
*H01M 6/10* (2006.01)

(52) U.S. Cl.
CPC ............... *H01M 4/32* (2013.01); *H01M 6/10* (2013.01); *Y02E 60/124* (2013.01); *Y02P 70/54* (2015.11)

(58) Field of Classification Search
USPC .......................................................... 429/94
See application file for complete search history.

(56) References Cited

FOREIGN PATENT DOCUMENTS

| | | |
|---|---|---|
| JP | 2973540 | 11/1999 |
| JP | 2001-319678 | 11/2001 |
| JP | 2002-319429 | 10/2002 |
| JP | 2003-208883 | 7/2003 |
| JP | 2008-146969 | 6/2008 |

\* cited by examiner

FIG. 1

* ━━ DENOTES A REINFORCED PORTION.

FIG. 2

* ━━ DENOTES A REINFORCED PORTION.

(CROSS-SECTIONAL VIEW OF CONVENTIONAL BATTERY)

\* ━━━ DENOTES A SUB-SEPARATOR.

(PLAN VIEW OF SEPARATOR IN EXPANDED STATE)

ENERGY STORAGE DEVICE INCLUDING SPIRAL ELECTRODE GROUP WITH REINFORCED SEPARATOR

CROSS-REFERENCE TO RELATED APPLICATION

This application claims the benefit of Japanese patent application No. 2013-094495 filed on Apr. 26, 2013, which is incorporated herein by reference.

FIELD

The present invention relates to an energy storage device with a spiral electrode group.

BACKGROUND

Conventionally, spiral electrode groups are known in which a positive electrode plate and a negative electrode plate are wound with a separator interposed therebetween. As disclosed in JP-A-2001-319678, there is a spiral electrode group in which a separator for reinforcement is provided on a radially outer side of a winding-start end of the positive electrode plate. The separator on the radially outer side of the winding-start end of the positive electrode plate is reinforced to prevent a short circuit caused by a corner portion, a burr of the winding-start end of the positive electrode plate, or the like.

Some consumer-use nickel metal hydride batteries or the like are configured such that a negative electrode plate is arranged not only in a radially outer circumference of a positive electrode plate but in an inner circumference of a winding-start end in order to achieve high energy density by utilizing a charge-discharge capacity of a positive electrode to the maximum. An energy storage device having the above-described configuration has a problem that a short circuit is caused by a corner portion, a burr or the like not only on the radially outer side of the winding-start end of the positive electrode plate but also on the radially inner side.

Figure 6:
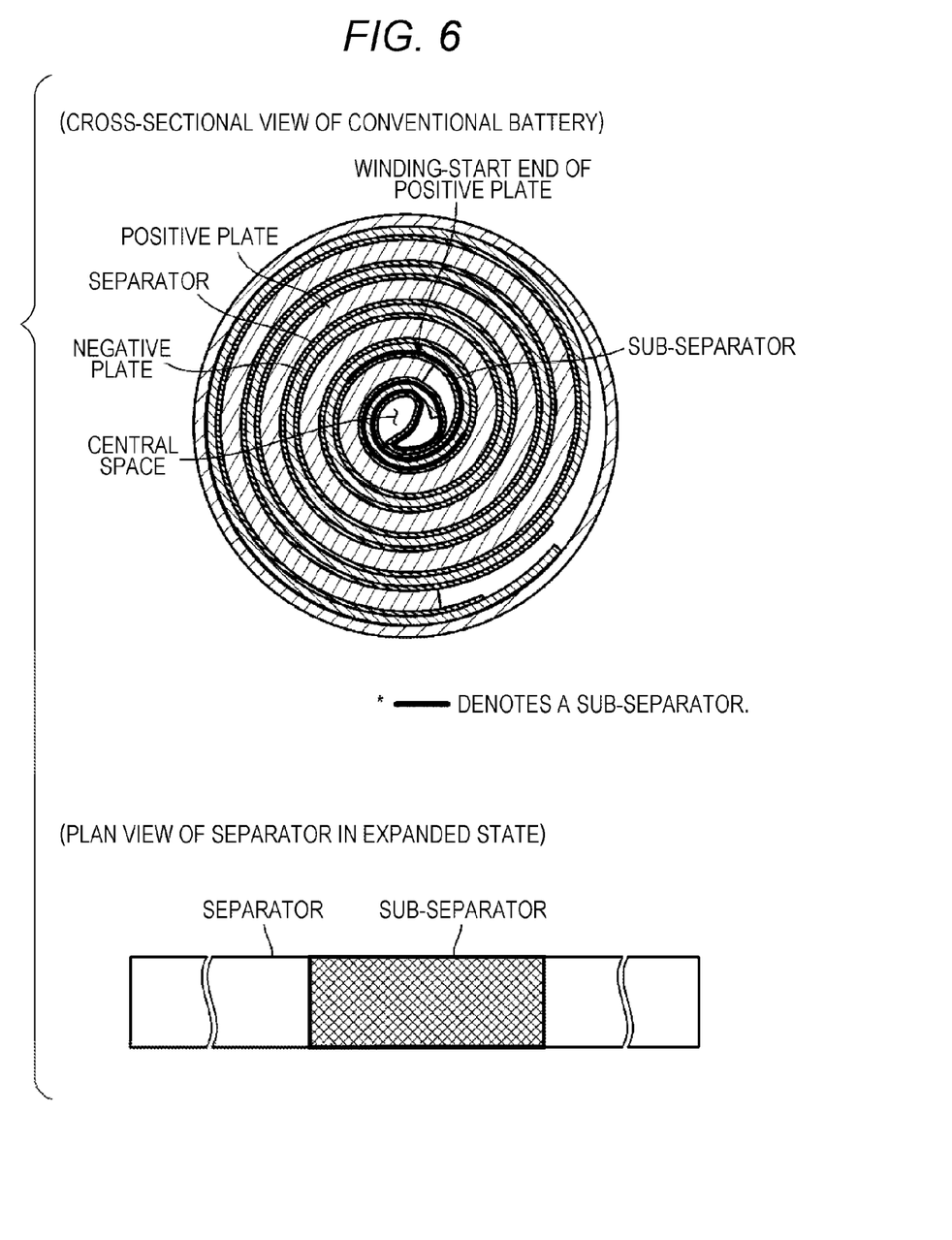
FIG. 6 shows a cross-sectional view of a conventional energy storage device having a spiral electrode group, and an expanded view of a separator therein.

Thus, as shown in FIG. 6, the configuration is such that one separator for reinforcement (sub-separator) is provided in a central portion of a separator in an expanded state (refer to a lower drawing of FIG. 6), and that the sub-separator is located both on the radially inner side of the winding-start end of the positive electrode plate and on the radially outer side of the winding-start end in a state wound spirally (refer to an upper drawing of FIG. 6).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

According to the above-described configuration, the separator for reinforcement is located inside a central space of the spiral electrode group, and this section is a wasteful section that does not contribute to short circuit prevention. The short circuit cannot be prevented unless the large amount of separator for reinforcement is used.

An object of the present invention is to efficiently prevent a short circuit with reduced reinforced portions.

An energy storage device according to an aspect of the present invention includes a spiral electrode group in which a first electrode plate and a second electrode plate having polarity reverse to that of the first electrode plate are spirally wound with a separator interposed therebetween, wherein the second electrode plate is opposed to an inner circumference and an outer circumference of the first electrode plate, portions of the separator are reinforced, the reinforced portions of the separator include a first reinforced portion formed between a winding-start end of the first electrode plate and the second electrode plate located on a radially outer side of the winding-start end, and a second reinforced portion formed between the winding-start end of the first electrode plate and the second electrode plate located on a radially inner side of the winding-start end, and the first reinforced portion and the second reinforced portion are arranged apart from each other.

BRIEF DESCRIPTION OF THE DRAWINGS

The foregoing and other features of the invention will become apparent to one skilled in the art to which the present invention relates upon consideration of the invention with reference to the accompanying drawings, wherein.

DESCRIPTION OF EMBODIMENTS

An energy storage device according to an aspect of the present invention includes a spiral electrode group in which a first electrode plate and a second electrode plate having polarity reverse to that of the first electrode plate are spirally wound with a separator interposed therebetween, wherein the second electrode plate is opposed to an inner circumference and an outer circumference of the first electrode plate, portions of the separator are reinforced, the reinforced portions of the separator include a first reinforced portion formed between a winding-start end of the first electrode plate and the second electrode plate located on a radially outer side of the winding-start end, and a second reinforced portion formed between the winding-start end of the first electrode plate and the second electrode plate located on a radially inner side of the winding-start end, and the first reinforced portion and the second reinforced portion are arranged apart from each other.

In the above-described energy storage device, since the second electrode plate is arranged in the inner circumference and the outer circumference of the first electrode plate, a section not involved with charge-discharge is prevented from being formed in the first electrode plate, so that the energy storage device with a high energy density can be manufactured by utilizing a charge-discharge capacity of the first electrode plate to the maximum.

Moreover, the second electrode plate is opposed to the inner circumference and the outer circumference of the first electrode plate, and strength in a separator region where the first electrode plate and the second electrode plate are opposed (the separator region of only a section where a short circuit easily occurs) is increased, which can prevent the separator from being damaged, and can efficiently prevent the short circuit.

It is preferable that the spiral electrode group has a central space, that the separator opposed to neither the first electrode plate nor the second electrode plate is arranged in the central space, and that the separator arranged in the central space includes a non-reinforced portion where reinforced portions which are reinforced are not formed.

The above-described configuration enables the separator to be wound in a state fixed to a winding shaft such as a winding core in the central space even when the one belt-like separator is used, thereby enabling the spiral electrode group to be easily manufactured. Moreover, since the section on the winding-start side with respect to the respective reinforced portions in the separator is located inside the central space of the spiral electrode group, and this section does not have the reinforced portion, the placement sections of the reinforced portions are reduced, which can exert an effect of short circuit prevention more efficiently.

It is preferable that the reinforced portions which are reinforced are wound at least once.

The above-described configuration enables position displacement between the reinforced portions and the winding-start end of the positive electrode plate at the time of manufacturing to be permitted. Moreover, since an area of the reinforced portions can be increased, the short circuit can be further prevented.

Moreover, it is preferable that in an energy storage device, the first electrode plate comprises an active material containing nickel oxide, and the second electrode plate comprises an active material containing a hydrogen storage alloy.

According to the above-described configuration, since the reinforced portions are arranged, in each of which the strength of the separator region where the first electrode plate and the second electrode plate having polarity reverse to that of the first electrode plate are opposed (the separator region of only the sections where the short circuit easily occurs) is increased, only the sections contributing to the short circuit prevention are reinforced, which can reduce a wasteful reinforced portion, and can efficiently prevent the short circuit.

Hereinafter, one embodiment of the present invention will be described with reference to the drawings.

Figure 1:
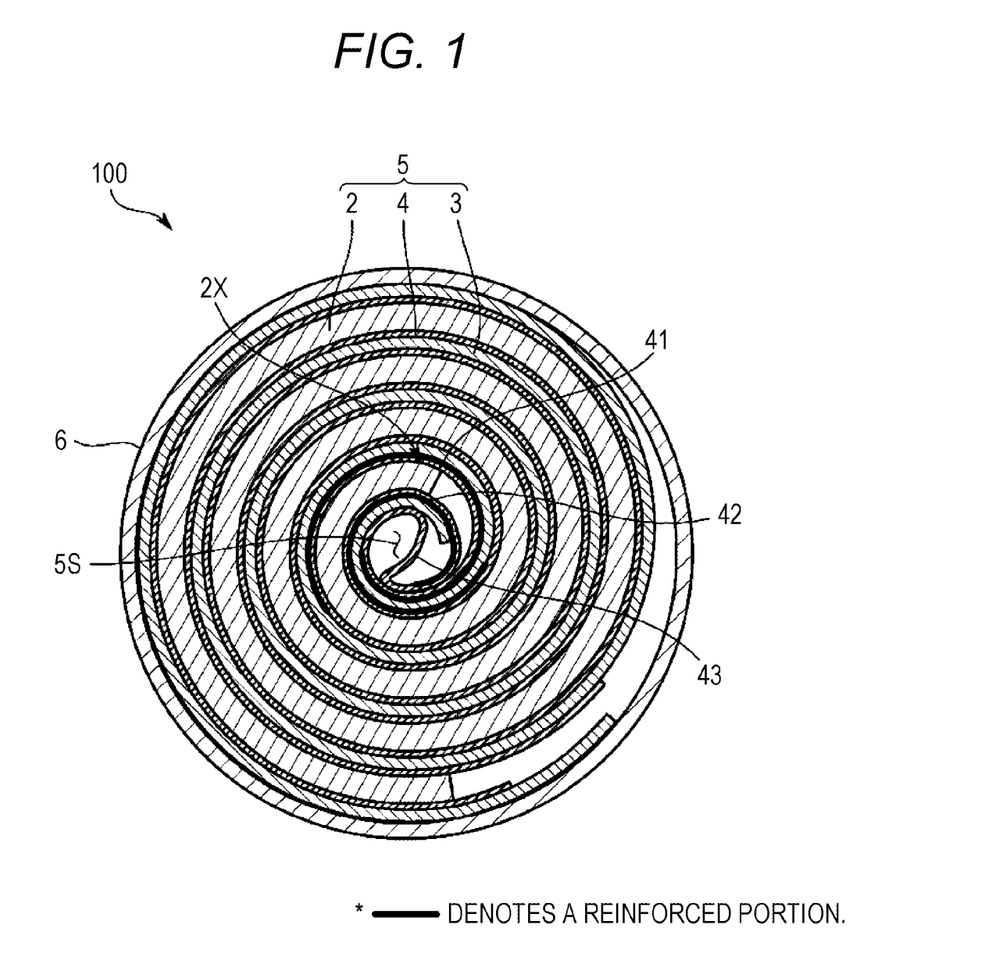
FIG. 1 shows a cross-sectional view of an energy storage device of an embodiment.

As shown in FIG. 1, an energy storage device 100 of the present embodiment is a cylindrical energy storage device in which a spiral electrode group 5 resulting from spirally winding a belt-like positive electrode plate 2 and a belt-like negative electrode plate 3 with a belt-like separator 4 interposed therebetween is contained in a cylindrical energy storage device case 6.

Specifically, the positive electrode plate 2 is configured by causing a positive base material such as, for example, a foaming type nickel porous body and the like to retain a positive active material containing nickel hydroxide. Moreover, the negative electrode plate 8 is configured by applying a negative active material containing a hydrogen storage alloy to a negative base material made of, for example, a punching steel plate. That is, the energy storage device 100 of the present embodiment is a nickel metal hydride battery in which a discharge capacity of the positive electrode plate 2 defines an energy storage device capacity.

The spiral electrode group 5 of the present embodiment is configured by spirally winding a layered body resulting from layering the separator 4 and the negative electrode plate 3 with the negative electrode plate 3 sandwiched by the separator 4 folded into two, and further layering the positive electrode plate 2 on one of outer surfaces of the separator 4.

Figure 2:
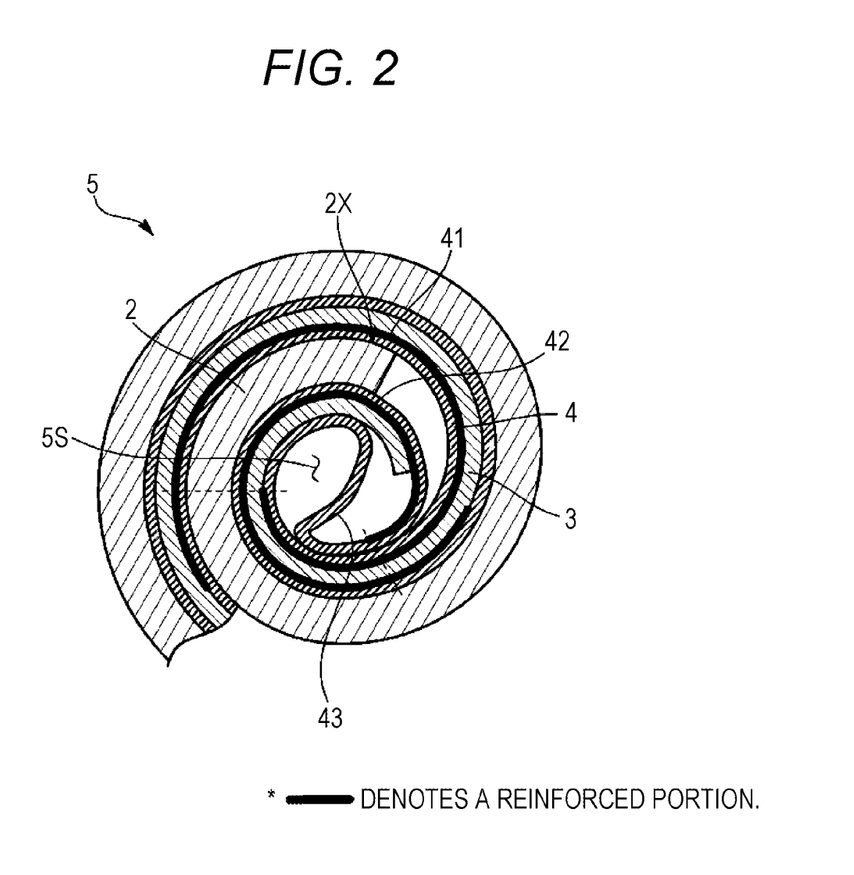
FIG. 2 shows a partially-enlarged cross-sectional view mainly illustrating a winding-start end of a positive electrode plate of the embodiment.

As shown in FIGS. 1 and 2, this energy storage device 100 is configured such that the negative electrode plate 8 is arranged on a radially outer side of a winding-start end 2X of the positive electrode plate 2 and on a radially inner side thereof. That is, in the spiral electrode group 5, the winding-start end 2X of the positive electrode plate 2 is sandwiched by the negative electrode plate 3 from the radially outer side and the radially inner side. The electrode plate located on a radially innermost side of the spiral electrode group 5 is the negative electrode plate 3.

In this configuration, as shown in FIGS. 1 and 2, the separator 4 has a first reinforced portion 41 formed between the winding-start end 2X of the positive electrode plate 2 and the negative electrode plate 3 located on the radially outer side of the winding-start end 2X, and a second reinforced portion 42 formed between the winding-start end 2X of the positive electrode plate 2 and the negative electrode plate 3 located on the radially inner side of the winding-start end 2X. These first reinforced portion 41 and the second reinforced portion 42 are wound at least once (go round), particularly as shown in FIG. 2.

As shown in FIGS. 1 and 2, a section of the separator 4 on the winding start side with respect to the first reinforced portion 41 and the second reinforced portion 42 is located inside a central space 5S of the spiral electrode group 5. The section of the separator 4 inside the central space 5S has a non-reinforced portion 43 where reinforced portions are not formed. This non-reinforced portion 43 is preferably formed in the substantially whole separator 4 located inside the central space 5S of the spiral electrode group 5.

Figure 3:
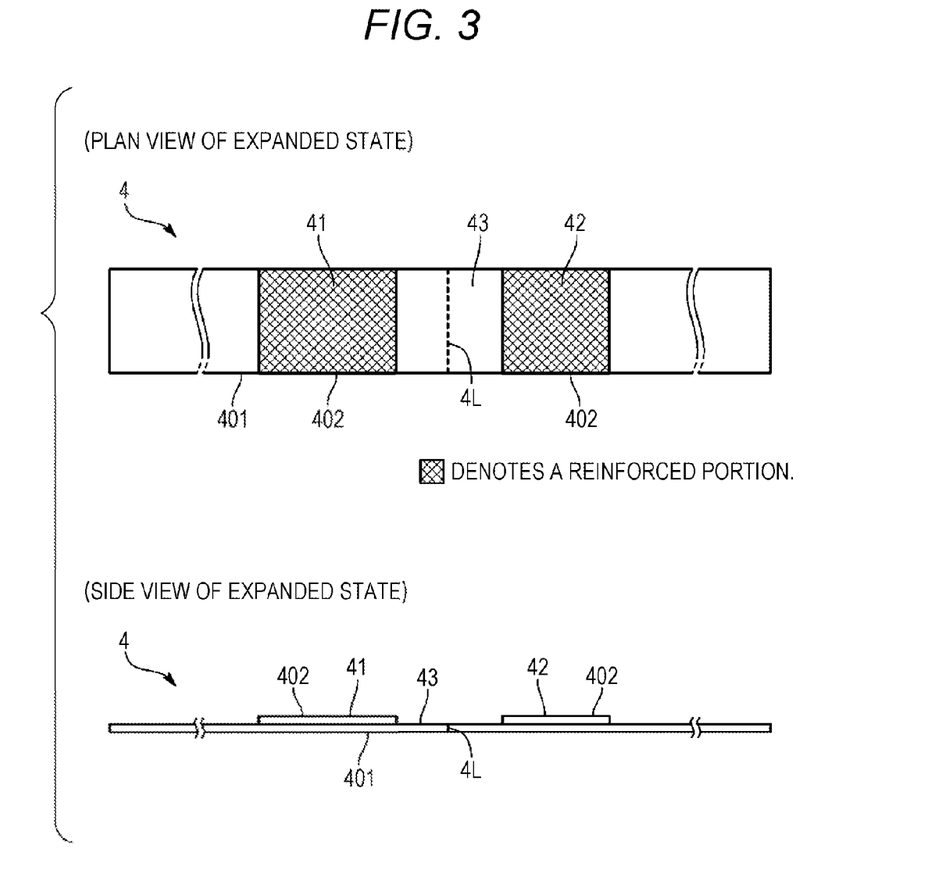
FIG. 3 shows a plan view and a side view of a separator in an expanded state of the embodiment.

The first reinforced portion 41 makes contact with a substantially whole outer surface forming a corner portion on the radially outer side of the winding-start end 2X of the positive electrode plate 2, and the second reinforced portion 42 makes contact with a substantially whole inner surface forming a corner portion on the radially inner side of the winding-start end 2X of the positive electrode plate 2. These first reinforced portion 41 and second reinforced portion 42 are configured by increasing a thickness of the separator 4. Specifically, the first reinforced portion 41 and the second reinforced portion 42 are each configured by superposing a rectangular reinforcement separator 402 on a belt-like separator body 401, for example, using welding or the like, as shown in FIG. 3. A section of the separator body 401 between the two reinforcement separators 402 is the non-reinforced portion 43.

The separator body 401 and the reinforcement separators 402 of the present embodiment are formed of a same material such as non-woven fabrics, for example, polyolefin. The separator body 401 and the reinforcement separators 402 may be formed of a different material from each other. A widthwise dimension along a central axis direction of the separator body 401 and a widthwise dimension along the central axis direction of the reinforcement separators 402 are substantially the same.

As shown in FIG. 3, the separator 4 configured as described above is belt-like, and in the expanded state, the rectangular first reinforced portion 41 and the rectangular second reinforced portion 42 are formed on both sides of the non-reinforced portion 43. In a state where the separator 4 is expanded, the non-reinforced portion 43 includes a folding line 4L, and the first reinforced portion 41 and the second reinforced portion 42 are formed on both sides of the non-reinforced portion 43. The first reinforced portion 41 and the second reinforced portion 42 are formed so as to be wound at least once when the separator 4 is spirally wound. Since a radius of curvature of the first reinforced portion 41 is larger than a radius of curvature of the second reinforced portion 42, in the present embodiment, a formation region of the first reinforced portion 41 is longer in a longitudinal direction. Dimensions in the longitudinal direction of the first reinforced portion 41 and the second reinforced portion 42 may be different from each other in this manner, or may be the same.

Next, a manufacturing method of the spiral electrode group 5 configured as described above will be described with reference to FIG. 4.

Figure 4:
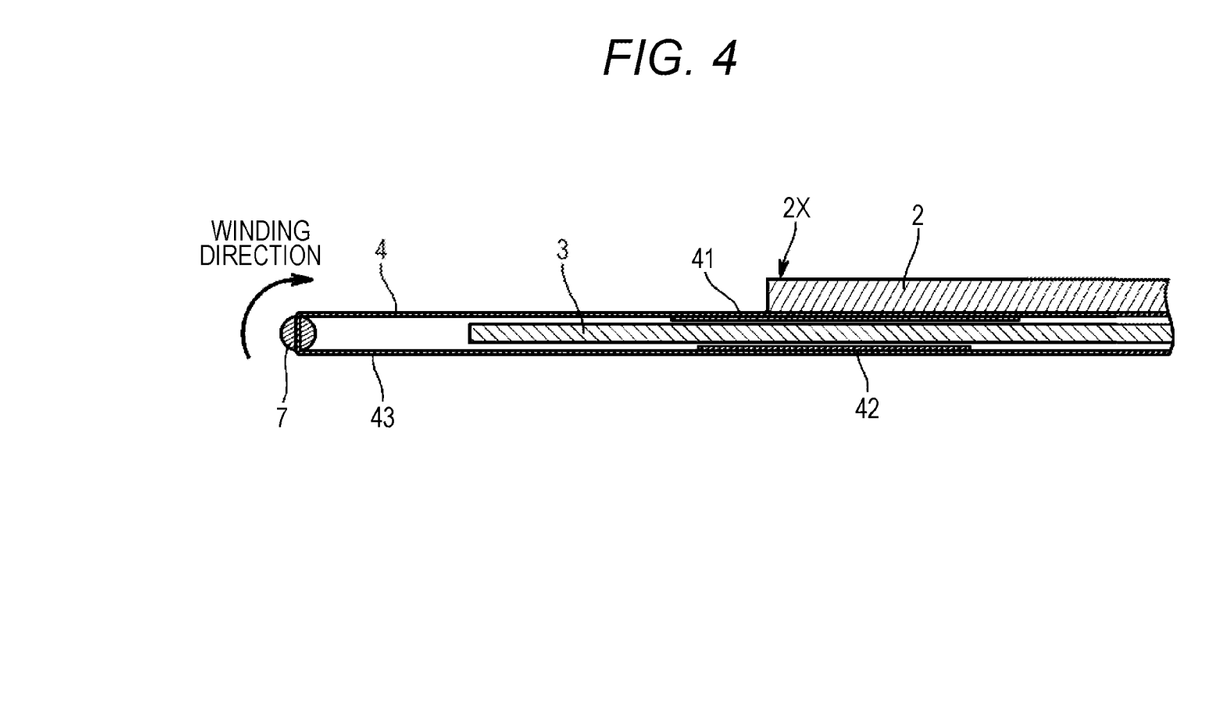
FIG. 4 shows a schematic view illustrating a manufacturing method of a spiral electrode group of the embodiment.

First, the reinforcement separators 402 are superposed on the separator body 401, for example, by thermal welding or the like to form the first reinforced portion 41 and the second reinforced portion 42 in the separator 4. These sections where these reinforcement separators 402 are superposed are the first reinforced portion 41 and the second reinforced portion 42.

Next, the non-reinforced portion 43 formed between the first reinforced portion 41 and the second reinforced portion 42 is folded into two, and the negative electrode plate 3 is sandwiched by the separator 4 folded into two. The positive electrode plate 2 is layered on one of the outer surfaces (the upper surface) of the separator 4. While in FIG. 4, the layered body is folded such that the two reinforced portions 41, 42 are arranged inside, the layered body may be folded such that the reinforced portions 41, 42 are arranged outside.

The layered body is wound, using a winding core 7. As shown in FIG. 4, the winding direction of the present embodiment is a direction in which the winding core 7 rotates on an upper side of the layered body toward the positive electrode plate 2 side (a clockwise direction in FIG. 4). As the specific winding method, after only the separator 4 is wound around the winding core 7 at least about once, only the negative electrode plate 3 is wound at least about once together with the separator 4. Thereafter, the negative electrode plate 3 and the positive electrode plate 2 are spirally wound together with the separator 4 while being rolled around the winding core 7. In this manner, winding only the negative electrode plate 3 at least once together with the separator 4 allows the negative electrode plate 2 to be located on the radially inner side of the winding-start end 2X of the positive electrode plate 2. After the winding, the winding core 7 is pulled and removed, by which the spiral electrode group 5 is formed.

When the winding direction by the winding core 7 is reverse, that is, when the winding core rotates in a direction in which the winding core rotates on a lower side of the layered body toward the opposite side of the positive electrode plate 2 (in a counterclockwise direction), the negative electrode plate 3 need not be wound once.

Effects of Present Embodiment

According to the energy storage device 100 according to the present embodiment configured as described above, since the negative electrode plate 3 is arranged on the radially outer side of the winding-start end 2X of the positive electrode plate 2 and on the radially inner side thereof, a section not involved with the charge-discharge is prevented from being formed in the positive electrode plate 2, which can sufficiently assure a battery capacity. Particularly, in the present embodiment, the nickel metal hydride battery, in which the discharge capacity of the positive electrode plate 2 regulates the battery capacity, is used, so that the effect of the present embodiment becomes more remarkable.

The first reinforced portion 41 is located between a corner portion on the radially inner side of the winding-start end 2X of the positive electrode plate 2, and the negative electrode plate 3, and the second reinforced portion 42 is located between a corner portion on the radially outer side of the winding-start end 2X of the positive electrode plate 2, and the negative electrode plate 3, which can prevent the two inner and outer corner portions of the winding-start end 2X of the positive electrode plate 2 from tearing the separator 4, thereby preventing a short circuit.

Furthermore, since the section of the separator 4 on the winding-start side with respect to the reinforced portions 41, 42 is located inside the central space 5S of the spiral electrode group 5, and this section has the non-reinforced portion 43 where the reinforced portions are not formed, a volume of the separator 4 occupying the central space 5S of the spiral electrode group 5 can be made smaller, and a residual space inside the energy storage device 100 can be increased, which can increase a capacity of an electrolyte solution.

In addition, since in the state where the separator 4 is expanded, the non-reinforced portion 43 includes the folding line 4L, and the first reinforced portion 41 and the second reinforced portion 42 are formed on both sides of the non-reinforced portion 43, the spiral electrode group 5 can be configured by the one separator 4, so that a parts count can be reduced, and winding work can be made easier. Particularly, the folding line 4L is included in the non-reinforced portion 43, which can make it easier to fold the separator 4 into two.

Additionally, since the first reinforced portion 41 and the second reinforced portion 42 are wound at least once, positional displacement between the respective reinforced portions 41, 42, and the winding-start end 2X of the positive electrode plate 2 at the time of manufacturing can be permitted. Moreover, since areas of the respective reinforced portions 41, 42 can be increased, a short circuit can be further prevented.

Other Embodiments

The present invention is not limited to the foregoing embodiment.

For example, while in the foregoing embodiment, the one separator is folded into two to configure the spiral electrode group, a spiral electrode group resulting from sandwiching a negative electrode plate between two separators and winding the same may be employed. In this case, in each of the separators, a reinforced portion may be formed in a section corresponding to a radially inner side or a radially outer side of a winding-start end of a positive electrode plate, and a winding-start end of each of the separators may have a non-reinforced portion.

Moreover, in addition to the configuration in which the first reinforced portion 41 and the second reinforced portion 42 are configured by superposing the reinforcement separators 402 on the separator body 401, a configuration may be employed, in which a thickness of the separator body itself is partially increased to thereby configure the first reinforced portion and the second reinforced portion, or when the separator body is non-woven fabrics, density is partially increased to thereby configure the first reinforced portion and the second reinforced portion.

Figure 5:
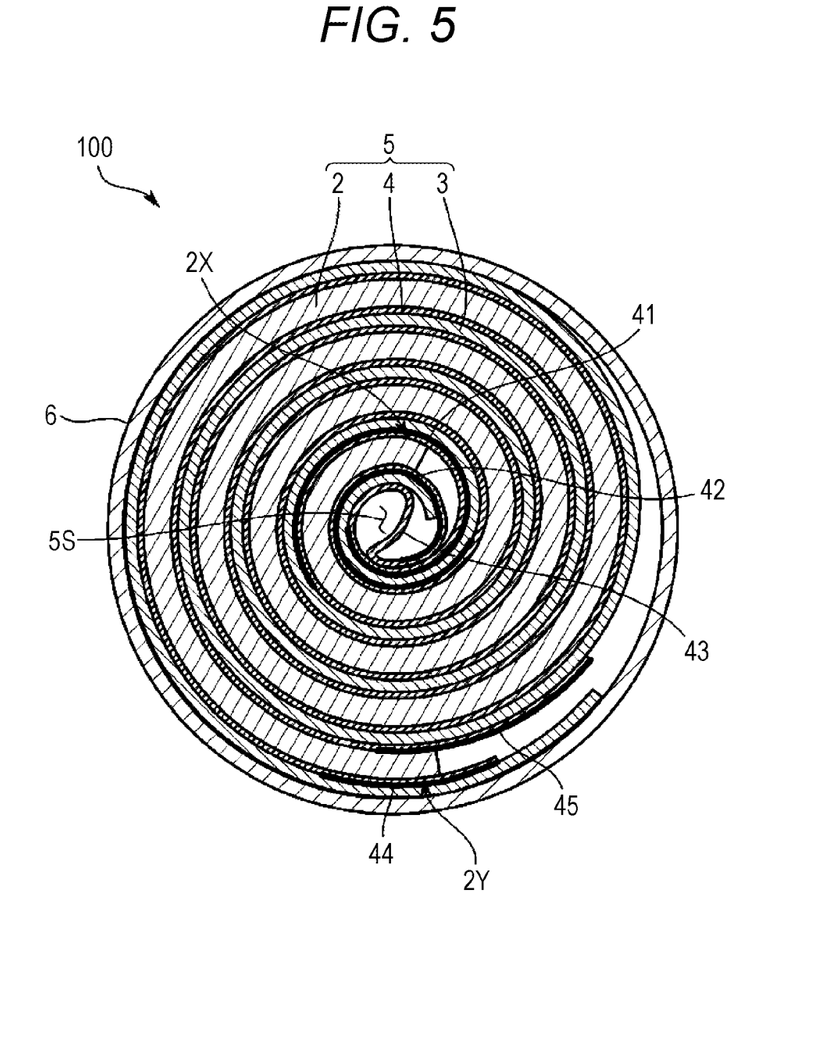
FIG. 5 shows a cross-sectional view of an energy storage device of a modification.

Furthermore, as shown in FIG. 5, in addition to the first reinforced portion 41 and the second reinforced portion 42, the separator may have a third reinforced portion 44 formed between a winding-finish end 2Y of the positive electrode plate 2, and the negative electrode plate 3 located on the radially outer side of the winding-finish end 2Y, and a fourth reinforced portion 45 formed between the winding-finish end 2Y of the positive electrode plate 2 and the negative electrode plate 3 located on the radially inner side of the winding-finish end 2Y. A configuration of these third reinforced portion 44 and fourth reinforced portion 45 are similar to that of the first reinforced portion 41 and the second reinforced portion 42.

Besides, while in the foregoing embodiment, the present invention is applied to the cylindrical energy storage device in which the spiral electrode group is contained in a cylindrical energy storage device case, the present invention can be applied to a prismatic energy storage device with a flat spiral electrode group, which is contained in a prismatic energy storage device case.

In addition, it goes without saying that the present invention is not limited to the foregoing embodiments, and that various modifications can be made within a range not departing from the gist.

What is claimed is:

1. An energy storage device comprising a spiral electrode group in which a first electrode plate and a second electrode plate having polarity reverse to that of the first electrode plate are spirally wound with a separator interposed therebetween, wherein
    the second electrode plate is opposed to an inner circumference and an outer circumference of the first electrode plate,
    portions of the separator comprise reinforced portions,
    said reinforced portions comprise non-woven fabric, polyolefin, or combinations thereof,
    the reinforced portions of the separator include a first reinforced portion formed between a winding-start end of the first electrode plate and the second electrode plate located on a radially outer side of the winding-start end, and a second reinforced portion formed between the winding-start end of the first electrode plate and the second electrode plate located on a radially inner side of the winding-start end,
    the first reinforced portion and the second reinforced portion are arranged apart from each other,
    the spiral electrode group has a central space, and
    none of the reinforced portions is located in the central space.

2. The energy storage device according to claim 1, wherein
    the separator arranged in the central space is not in contact with the first electrode plate and the second electrode plate and includes a non-reinforced portion where the reinforced portions are not formed.

3. The energy storage device according to claim 1, wherein the reinforced portions which are reinforced are wound at least once.

4. The energy storage device according to claim 1, wherein
    the first electrode plate comprises an active material containing nickel oxide, and
    the second electrode plate comprises an active material containing a hydrogen storage alloy.

5. The energy storage device according to claim 1, wherein the reinforced portions comprises an inner surface and an outer surface, and an entire surface of one of the inner surface and the outer surface of the reinforced portions is in contact with the separator.

6. The energy storage device according to claim 2, wherein the non-reinforced portion is located in a substantially whole of the separator arranged in the central space.

7. The energy storage device according to claim 2, wherein
    the separator is folded into two along a folding line, and the non-reinforced portion comprises the folding line.

8. The energy storage device according to claim 7, wherein
    the non-reinforced portion is arranged between the first reinforced portion and the second reinforced portion when the separator is unfolded along the folding line.

* * * * *